(12) United States Patent
Redfield

(10) Patent No.: US 7,034,667 B2
(45) Date of Patent: Apr. 25, 2006

(54) GEAR MOTOR USED TO EXTEND SAFETY DEVICE ON SCHOOL BUS

(75) Inventor: William H. Redfield, Lake Forest, IL (US)

(73) Assignee: Molon Motor & Coil Corp., Rolling Meadows, IL (US)

( * ) Notice: Subject to any disclaimer, the term of this patent is extended or adjusted under 35 U.S.C. 154(b) by 126 days.

(21) Appl. No.: 10/796,129

(22) Filed: Mar. 10, 2004

(65) Prior Publication Data

US 2005/0200461 A1 Sep. 15, 2005

(51) Int. Cl.
*B60Q 1/26* (2006.01)

(52) U.S. Cl. .......................... 340/433; 310/40; 310/83; 340/436

(58) Field of Classification Search ................ 340/433, 340/904, 436; 310/83
See application file for complete search history.

(56) References Cited

U.S. PATENT DOCUMENTS

| | | | |
|---|---|---|---|
| 2,209,407 A | | 7/1940 | Reibel |
| 4,766,413 A | * | 8/1988 | Reavell ...................... 340/433 |
| 4,916,372 A | | 4/1990 | Reavell et al. |
| 4,956,630 A | | 9/1990 | Wicker |
| 5,005,906 A | * | 4/1991 | Suzuki et al. ............... 297/362 |
| 5,036,307 A | | 7/1991 | Reavell et al. |
| 5,132,662 A | * | 7/1992 | Burch ........................ 340/433 |
| 5,159,221 A | * | 10/1992 | Miyazaki et al. ........... 310/239 |
| 5,357,239 A | | 10/1994 | Lamparter |
| 5,406,250 A | | 4/1995 | Reavell et al. |
| 5,781,120 A | * | 7/1998 | Kucik ...................... 340/425.5 |
| 5,847,642 A | * | 12/1998 | Esposito et al. ............ 340/433 |
| 6,011,336 A | | 1/2000 | Mathis et al. |
| 6,054,785 A | | 4/2000 | Kerdjoudj et al. |
| 6,201,364 B1 | * | 3/2001 | Will et al. ................... 318/466 |
| D451,072 S | * | 11/2001 | Kerdjoudj et al. ......... D13/122 |
| 6,389,753 B1 | * | 5/2002 | Fenelon ....................... 49/348 |
| 6,465,915 B1 | * | 10/2002 | Kerdjoudj et al. .... 310/40 MM |

FOREIGN PATENT DOCUMENTS

EP 0 470 284 2/1992

\* cited by examiner

*Primary Examiner*—Jeffery Hofsass
*Assistant Examiner*—Hoi C. Lau
(74) *Attorney, Agent, or Firm*—Oblon, Spivak, McClelland, Maier & Neustadt, P.C.

(57) ABSTRACT

In a deployment apparatus for extending a safety device from a school bus, the safety device is attached to a connector which is rotated about a pivot pin that is turned by a friction clutch driven by an output shaft. The safety device may be either a guard arm on a front bumper or a stop sign on a side of the school bus. The present invention is an improvement, i.e. an L-shaped bracket and a gear box are integrally molded together into a unitary structure. Gears inside the box turn the output shaft and an electric motor, operatively connected to the gear box, drives the gears. Furthermore, the L-shaped bracket has closed-end elongated slots through which fasteners extend to secure the unitary structure to an inside wall of the deployment apparatus. Because the L-shaped bracket and the gear box form a unitary structure, vibrations and constant jarring caused by the school bus do not separate the L-shaped bracket from the gear box, as may occur in the prior art devices which have an L-shaped bracket and a separate gear box bolted together.

4 Claims, 6 Drawing Sheets

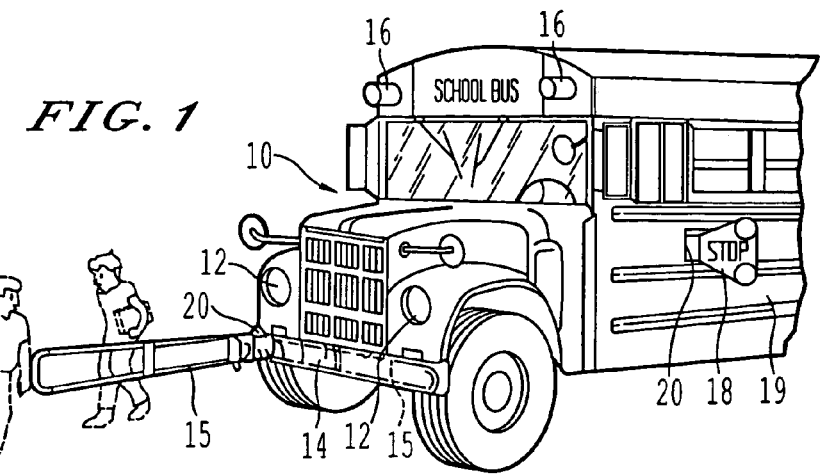
FIG. 1
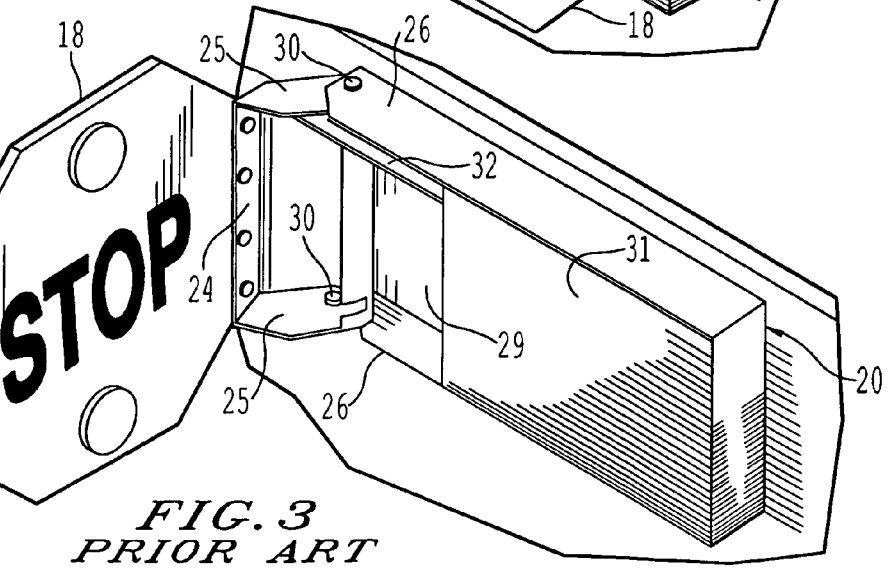
FIG. 2
FIG. 3
PRIOR ART

GEAR MOTOR USED TO EXTEND SAFETY DEVICE ON SCHOOL BUS

CROSS REFERENCE TO RELATED APPLICATION

This utility patent application is related to U.S. Design patent application Ser. No. 29/189,971 filed on Sep. 15, 2003.

BACKGROUND OF THE INVENTION

1. Field of the Invention

The invention relates to machine elements, supports and electrical motor structures generally and in particular to a gear motor with either a plastic or a resin box and an integral supporting bracket.

2. Discussion of the Prior Art

In a known deployment apparatus on a school bus with a swinging safety device, a metallic gear box is attached to a separate, generally L-shaped, metallic bracket with multiple nuts and bolts. The gear box and the attached bracket are secured inside the deployment apparatus from which the safety device extends when a gear motor is activated by the driver. Different devices may be used for mounting the safety device to the deployment apparatus on the school bus.

For example, inside the deployment apparatus, one L-shaped bracket attached to a known gear box includes open-ended slots. However, these slots allow the L-shaped bracket carrying the gear box to disengage from inside the deployment apparatus if the mounting nuts and bolts are jarred loose. See FIG. 4 of U.S. Pat. No. 5,132,662 issued to Burch on Jul. 21, 1992.

In FIG. 1, a typical school bus 10 has front lights 12 and a front bumper 14. Flashing safety stop lights 16 are lit when the school bus 10 is stopped to take on or discharge passengers through a front door (not shown). A rear door (also not shown) is used only in the event of an emergency. When the school bus 10 is stopped for passengers entering and exiting, a guard arm 15 is extended from a first deployment apparatus 20 mounted on the front bumper 14 and a stop sign 18 is extended from a second similar deployment apparatus 20 mounted on a side wall 19 of the school bus 10. The guard arm 15 is shown in phantom lines in a normally retracted position resting on the first deployment apparatus 20 mounted on the front bumper 14. When activated by the driver, the guard arm 15 is extended by swinging outwardly approximately 90° to the deployed position shown in solid lines in FIG. 1.

In FIG. 2, the stop sign 18 is shown in a normally retracted position resting on the second deployment apparatus 20 mounted on the side wall 19. Lights 22 on the stop sign 18 are also illuminated when the stop sign 18 is extended by swinging outwardly at approximately 90° angle to the deployed position shown in FIG. 1.

In FIG. 3, there is shown a prior art device covered by U.S. Pat. No. 5,406,250 which was issued to Reavell et al. on Apr. 11, 1995. In this prior art device, a vertical connector 24 has top and bottom flanges 25 pivotally secured inside respective top and bottom sides 26 of the second deployment apparatus 20 via pivot pins 30. In addition to the sides 26, the second deployment apparatus 20 has an inside wall 29 and an outside cover 31. The apparatus 20 encloses a friction clutch (not shown) to be described below for moving the vertical connector 24. This stop sign 18 is pivoted to the deployed state of FIG. 3 from the retracted state of FIG. 2 by a link 32 under the cover 31 of the apparatus 20.

In FIG. 4, there is another prior art device covered by U.S. Pat. No. 5,132,662 which was issued to Burch on Jul. 21, 1992. The top side 26 has mounted thereto a friction clutch 36 for the stop sign (not shown) which is secured to the vertical connector 24 by bolts 27. A steel torsion spring 50 surrounds the friction clutch 36 and controls the torque of the clutch 36. The top and bottom flanges 25 of the vertical connector 24 are pivotally secured outside the respective top and bottom sides 26 of the deployment apparatus by the pivot pins 30. A nut 34 and a washer 48 secure the upper pivot pin 30 into position. This upper pivot pin 30 extends downwardly through the friction clutch 36, an L-shaped bracket 38 and a gear box 40. Nuts 42 and bolts 44 attach the gear box 40 to the L-shaped bracket 38. A motor 46 drives the gears (not shown) inside the box 40 when activated through two electric wires 49 by the driver of the school bus.

FIG. 5 is a partial cross-sectional view of the prior art structure shown in FIG. 4. From top to bottom in FIG. 5, there is illustrated the pivot pin 30, the nut 34, the washer 48, the top flange 25, the friction clutch 36, the ring 50, the L-shaped bracket 38, the bolts 44, the nuts 42, the gear box 40, the motor 46 and the electric wire 49.

The operation of the prior art device shown in FIGS. 4 and 5 may be described as follows. When the motor 46 in FIG. 5 is energized through the electric wire 49 by the driver, the gears (not shown) inside the box 40 are turned to rotate an output shaft 53 engaged with the friction clutch 36 which turns the pivot pin 30 together with the nut 34, the washer 48 and the top flange 25. Referring now to FIG. 4, the top flange 25 is formed integrally with the vertical connector 24 and the bottom flange 25. So, when the top flange 25 rotates out of its retracted position, the vertical connector 24 rotates also and carries with it the bolts 27 to which are secured the stop sign 18 seen in FIGS. 1–3. Thus, the stop sign 18 is extended. Returning to FIG. 4, when the driver actuates a switch (not shown) that reverses the current to the two electric wires 49, the motor 46 returns the stop sign, the vertical connector 24, the top flange 25 and the friction clutch 36 to their retracted positions.

Referring to FIG. 5, the L-shaped bracket 38 is shown with two open-ended slots 52. Bolts 54, nuts 56 and washers 58 extend through the two slots 52 to secure the L-shaped bracket 30 to the inside wall 29 of the second deployment apparatus 20, best seen in FIG. 3. As one may imagine from viewing FIG. 5, constant vibration and jarring may loosen the nuts 56 and cause the L-shaped bracket 38 to slide down due to slippage of the bolts 54 along the open-ended slots 52, so that the pivot pin 30 disengages from the friction clutch 36. Likewise, constant vibration and jarring may loosen the nuts 42 and cause the L-shaped bracket 38 to separate due to unfastening of the bolts 44, so that the gear box 40 disengages from the L-shaped bracket 38.

These problems in the prior art could not be solved by the gear boxes disclosed in U.S. Design Pat. No. D451,072 issued on Nov. 27, 2001, and U.S. Utility Pat. Ser. No. 6,465,915 issued on Oct. 15, 2002, both owned by the assignee of the present invention, without making some structural modifications to the gear boxes.

Thus, it remains a problem in the prior art to keep a gear box and an L-shaped bracket secured together and attached to a wall inside a deployment apparatus for extending a safety device from a school bus.

SUMMARY OF THE INVENTION

A gear box and an L-shaped bracket are molded integrally together. The L-shaped bracket has elongated slots with closed ends so that bolts extend there through and secure the L-shaped bracket with its integral gear box to a wall inside a deployment apparatus which rotates a safety device to an angle from a retracted position on a school bus. One safety device is a guard arm which swings out from a front bumper to guide the children away from the front of the bus so that the driver may readily see them. Another safety device is a stop sign which swings out from a side of the school bus. Thus, the stop sign may be readily seen and observed by motorists approaching from behind and also from the front of the school bus.

BRIEF DESCRIPTION OF THE DRAWINGS

A complete appreciation of the invention and its advantages will be obtained as the invention becomes better understood by reference to the accompanying drawings and the following detailed description of the preferred embodiment.

FIG. 1 shows a front perspective view of a school bus having a first deployment apparatus attached to a front bumper and also having a second deployment apparatus attached to a side wall of the school bus.

FIG. 2 shows a side perspective view of the deployment apparatus with a stop sign in its retracted position on the side wall of the school bus.

FIG. 3 shows a side perspective view of a first prior art deployment apparatus with the stop sign in its extended position on the side wall of the school bus.

DETAILED DESCRIPTION OF THE PREFERRED EMBODIMENT

Figure 4:
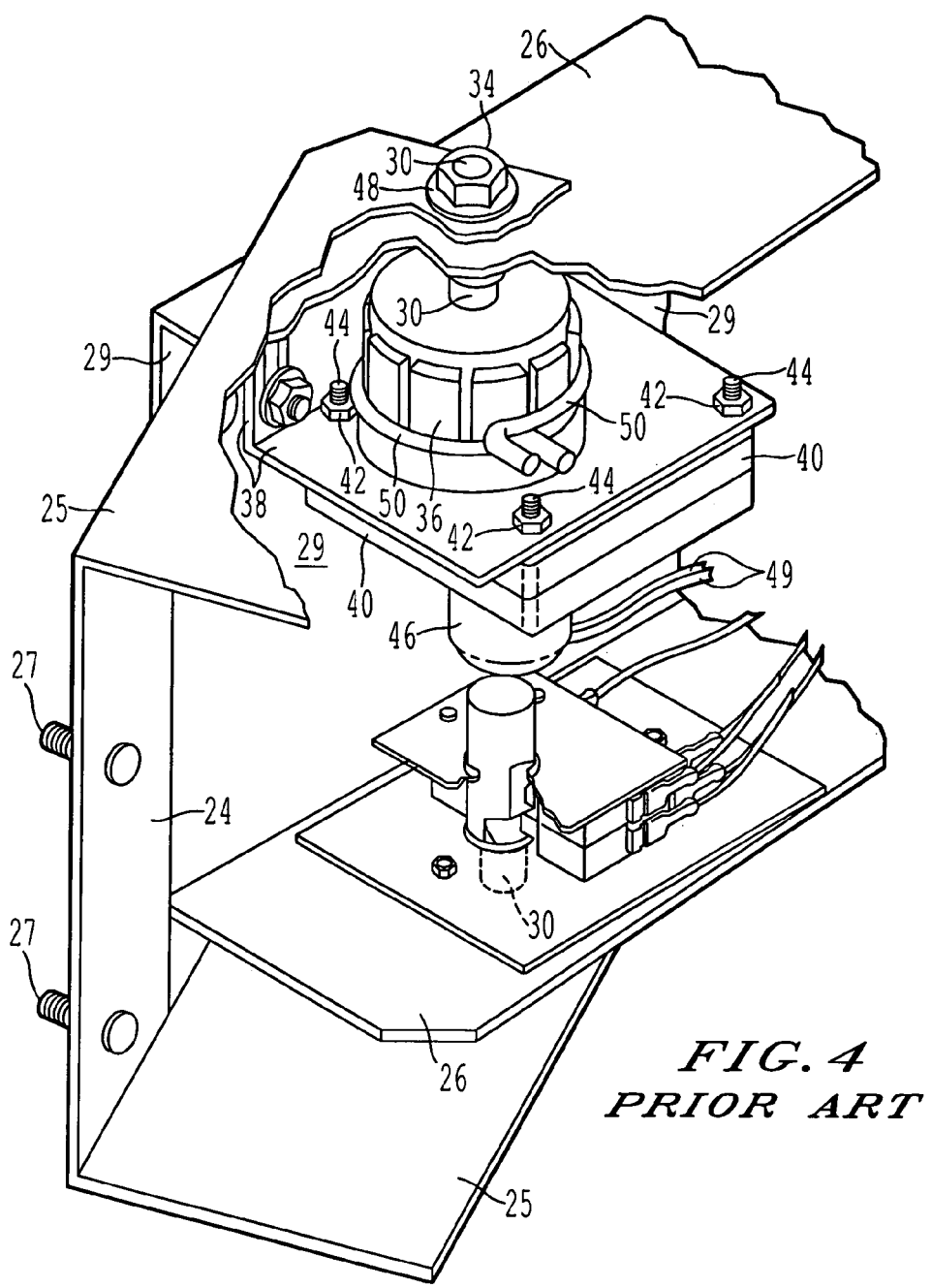
FIG. 4 shows a partially broken away side perspective view of a second prior art deployment apparatus extending a connector for the stop sign (not shown) from the side wall of the school bus.

Referring now to the drawings, like reference numerals designate identical or corresponding parts throughout the several views. Features of the invention will become apparent in the course of the following description of the preferred embodiment which is given only for illustration of the invention and which is not intended to limit its scope.

Figure 6:
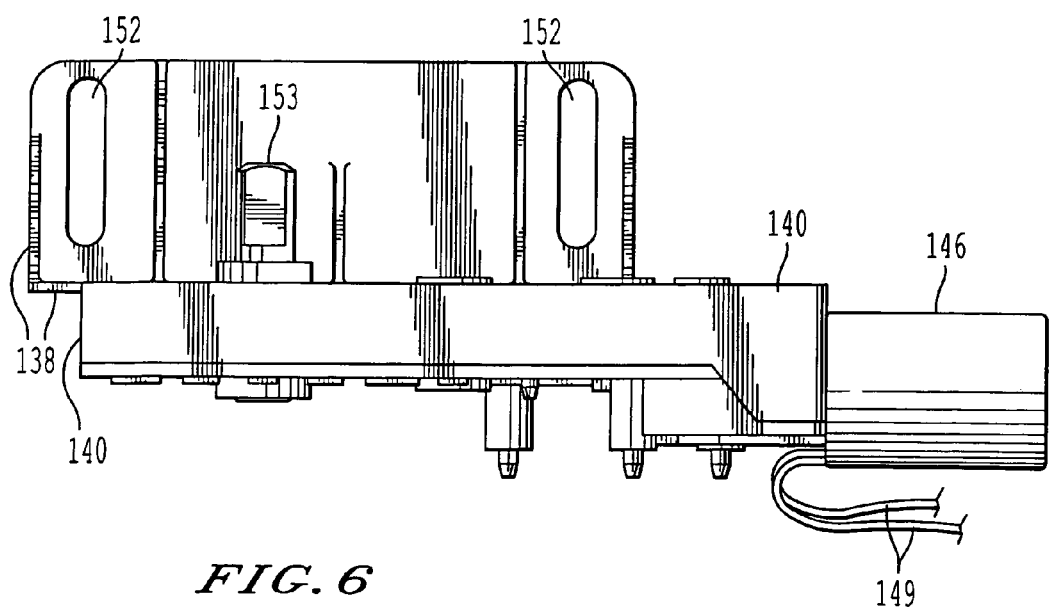
FIG. 6 shows a side elevational view of the present invention.

In FIG. 6, there is shown a side elevational view of the preferred embodiment. An L-shaped supporting bracket 138 has closed-end elongated slots 152 and is formed integrally by molding with a gear box 140. A motor 146, which is energized by positive and negative electric lead wires 149, drives the gears (not shown) inside the box 140 to rotate an output shaft 153.

The bracket 138 and the gear box 140 are molded to form a unitary structure out of either a plastic or a resin material. In the prior art device shown in FIGS. 4 and 5, the bracket 38 and the gear box 40 are fabricated as separate units out of heavy metal such as zinc or steel.

Figure 5:
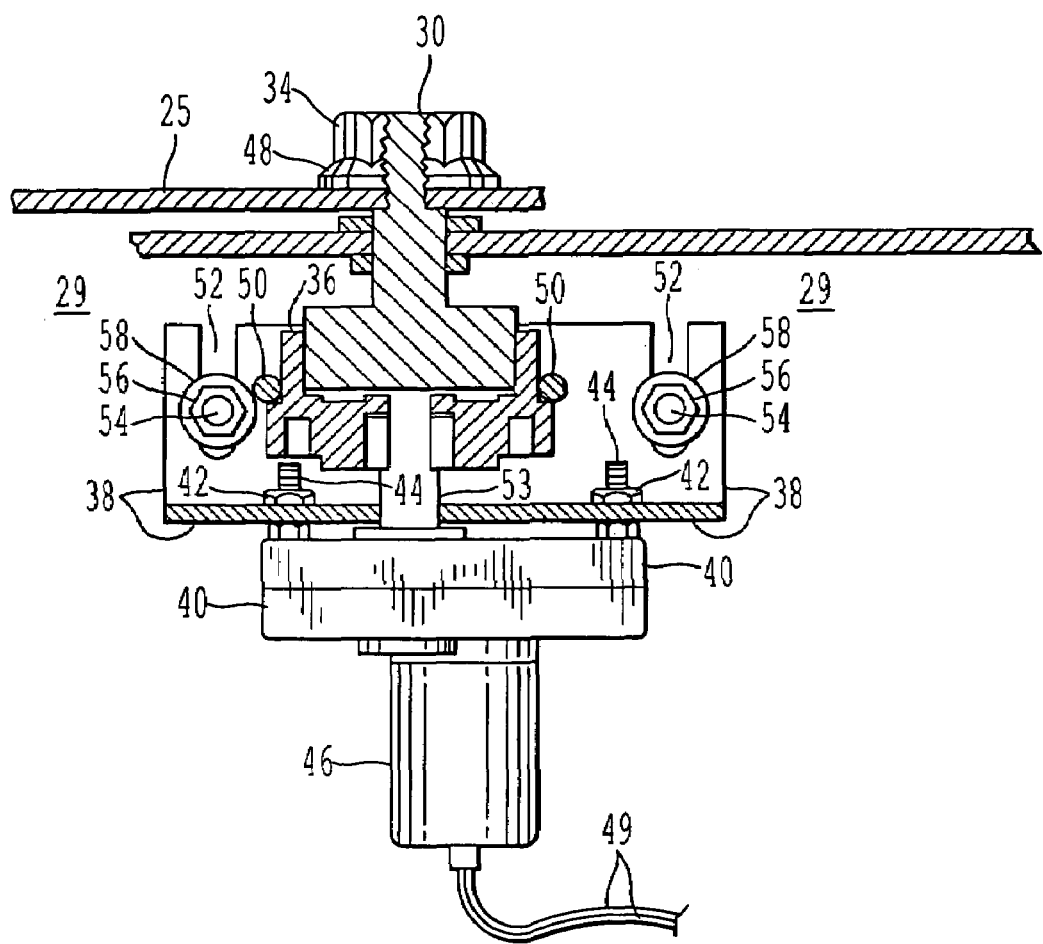
FIG. 5 shows a cross-sectional, side elevational view of the second prior art deployment apparatus seen in FIG. 4.

Thus, in FIG. 6, the L-shaped bracket 138, the closed-end slots 152, the gear box 140, the output shaft 153, the motor 146 and the electric wires 149 replace, respectively, in the prior art device of FIG. 5, the L-shaped bracket 38, the open-ended slots 52, the gear box 40, the output shaft 53, the motor 46 and the electric wire 49. The enumerated elements of the present invention seen in FIG. 6 are dropped in to replace the corresponding elements in the prior art device of FIG. 5.

Because the L-shaped bracket 138 is molded integrally with the gear box 140, the nuts 42 and the bolts 44 in the prior art device of FIG. 5 are eliminated.

Also, because the slots 152 in FIG. 6 have closed ends, the bolts 54, the nuts 56 and the washers 58 in FIG. 5 cannot slip out as they can from the open end of the slots 52 when they are vibrated or jarred too severely in the prior art device. Although the bolts 54, the nuts 56 and the washers 58 are preferred to secure the L-shaped bracket 138 through the slots 152 to the inside wall 29 of the deployment apparatus 20, other types of fasteners such as screws and rivets may likewise be used instead.

Otherwise, the present invention operates in a manner similar to the prior art device of FIG. 5. First referring to FIG. 6, when the motor 146 is operatively connected to the box 140 and is energized through the electric wires 149 by the driver, the gears (not shown) inside the box 140 are turned to rotate the output shaft 153 engaged with the friction clutch 36 of FIG. 5. As seen in FIG. 5, the friction clutch 36 turns the pivot pin 30 together with the nut 34, the washer 48 and the top flange 25. Referring back to FIG. 4, when the top flange 25 rotates out of its retracted position, the vertical connector 24 rotates also and carries with it the bolts 27 to which are secured the stop sign 18 seen in FIGS. 1–3. Thus, the stop sign 18, as well as the guard arm 15, is more reliably extended by the present invention than by the prior art devices which have the risk of disengagement of the L-shaped bracket 38 from the inside wall 29 or the risk of disengagement of the motor 40 from the L-shaped bracket 38.

Figure 7:
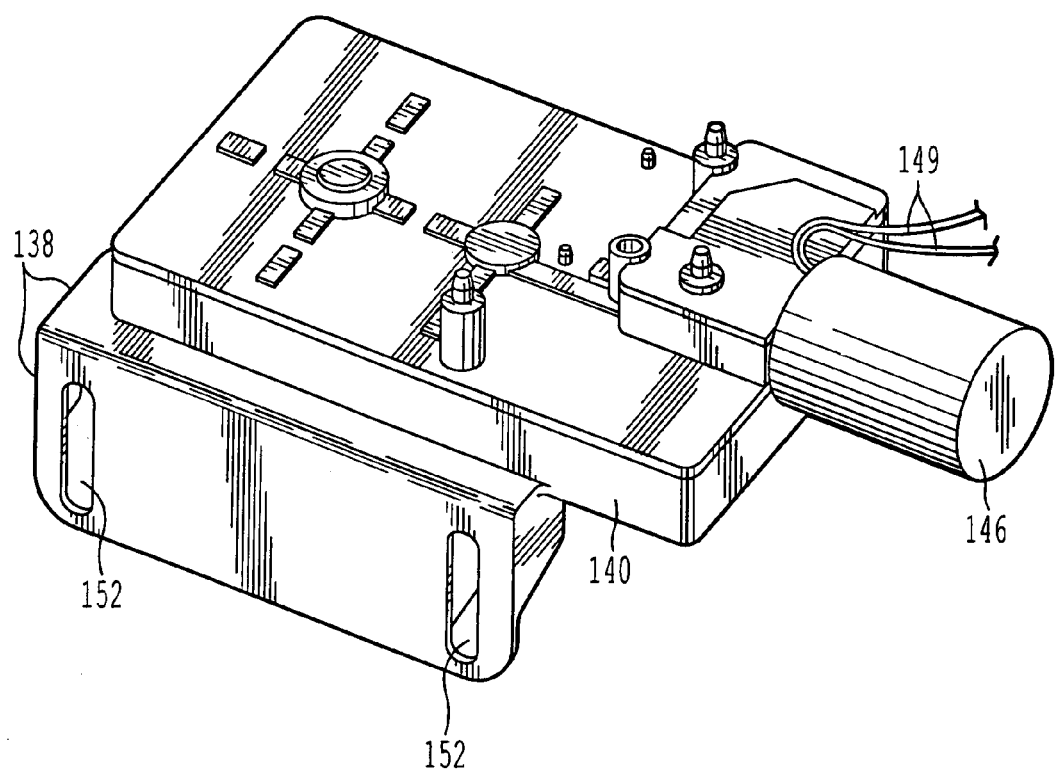
FIG. 7 shows a bottom side perspective view of the present invention.

In FIG. 7, there is shown a bottom side perspective view in which the L-shaped bracket 138 is seen to be integrally molded to the gear box 140. The motor 146, which may use either direct current (DC) or alternating current (AC), is attached to one end of the gear box 140 and is energized by the electric wires 149 when activated by the driver. For the motor 146, direct current (DC) is preferred.

Figure 8:
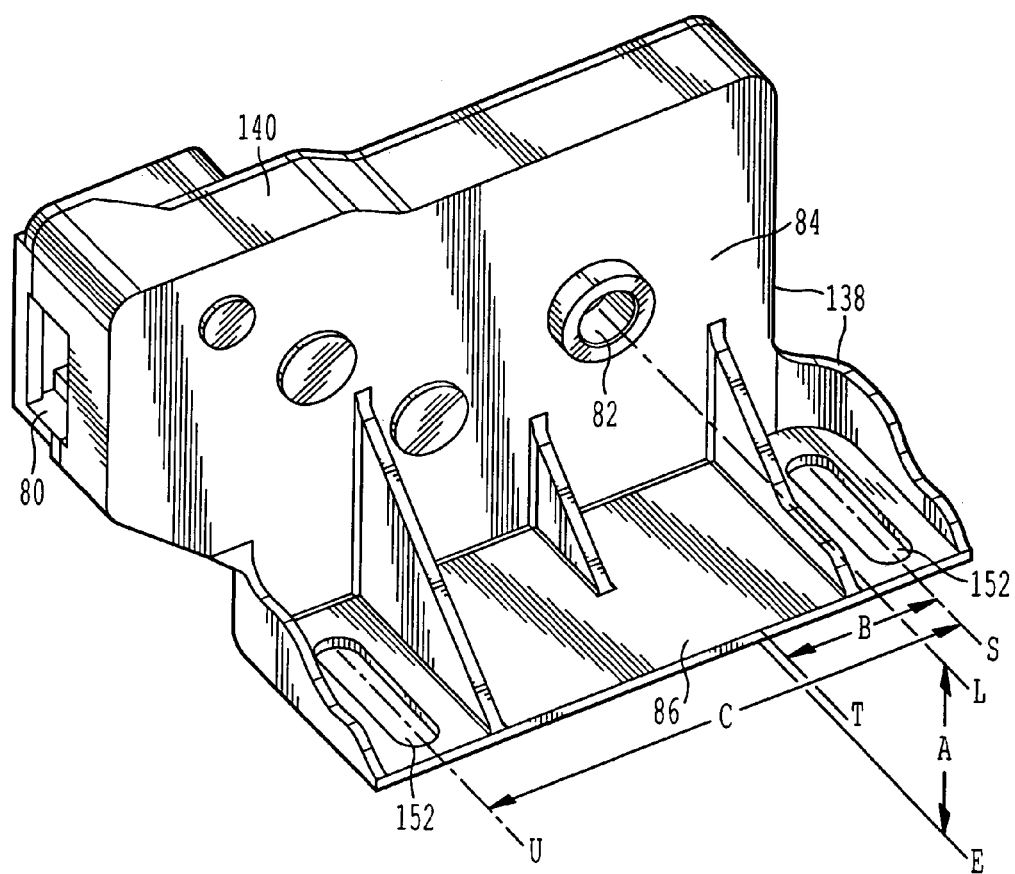
FIG. 8 shows a top side perspective view of the present invention.

In FIG. 8, there is shown a top side perspective view in which the L-shaped bracket 138 is also seen to be integrally molded to the gear box 140. A port 80 is provided in the gear box 140 for attachment of the motor (not shown). A bore 82 is formed in the gear box 140 and in a first leg 84 of the L-shaped bracket 138. The output shaft 153 of FIG. 6 extends through the bore 82 of FIG. 8 so that the output shaft (not shown) may engage with the friction clutch 36 of FIG. 5.

In FIG. 8, some preferred dimensions are illustrated so that the L-shaped bracket 138 and the gear box 140 may fit as a replacement for any L-shaped bracket 38 and any gear box 40 known in the prior art devices of FIGS. 4 and 5.

For example, in FIG. 8, a distance A from a center line L through the bore 82 to a bottom edge E of a second leg 86 of the L-shaped bracket 138 varies from 1.6 to 1.7 inches. Note that the second leg 86 is substantially perpendicular to the first leg 84 of the L-shaped bracket 138. A distance B from a top edge line T on the second leg 86 of the L-shaped bracket 138 to a longitudinal center line S of the nearer closed-end slot 152 varies from 1.1 to 1.3 inches. Note that the top edge line T on the second leg 86 is directly below the center line L through the bore 82. A preferred thickness of the second leg 86 is 0.08 inch which is the distance between the bottom edge E and the top edge line T of the second leg

86. Thus, a distance between the center line L and the second leg 86 varies from 1.62 to 1.70 inches, depending upon whether one measures to the top edge line T or the bottom edge E, respectively, of the second leg 86. A distance C from the longitudinal center line S of the closed-end slot 152 on the viewer's right to a longitudinal center line U of the closed-end slot 152 on the viewer's left may vary from 3.0 to 3.5 inches.

There are several advantages of the present invention shown in FIGS. 6–8 over the prior art device shown in FIGS. 4 and 5. First of all, because the present invention is made of plastic or resin material, it is lighter in weight than the heavy metal parts of the prior art device. This lighter weight provides a slight fuel savings for school buses using the present invention.

Secondly, because the present invention has a unitary molded construction, it is easier to manufacture than the two-part fabricated metal device of the prior art. Thus, the cost for making the present invention is less expensive than the prior art device.

Finally, because the present invention eliminates that nuts 42 and the bolts 44 seen in FIGS. 4 and 5 of the prior art device, the present invention is easier to assemble into the deployment apparatus illustrated in FIGS. 1–3. This ease of assembly saves time and labor costs.

Numerous modifications and variations of the present invention are possible in light of the above teachings. Thus, it is to be understood that, within the scope of the appended claims, the invention may be practiced in other ways than in the manner specifically described herein.

I claim:

1. In a deployment apparatus for extending a safety device for a school bus, said safety device being attached to a connector which is rotated about a pivot pin that is turned by a friction clutch driven by an output shaft, an improvement comprising:

a gear box having a substantially rectangular cross-section with two opposite long ends and two opposite short ends;

an L-shaped bracket integrally molded together with the gear box along one long end into a unitary structure; and an electric motor operatively connected to the gear box and configured to drive the output shaft;

wherein said L-shaped bracket has closed-end elongated slots through which fasteners extend to secure the unitary structure to an inside wall of the deployment apparatus;

wherein said L-shaped bracket has a first leg and a second leg substantially perpendicular to the first leg;

wherein said gear box and the front leg of the L-shaped bracket have a bore formed therein;

wherein the output shaft extends through the bore; and wherein a center line through the bore is parallel to the plane of the second leg of the L-shaped bracket.

2. In the deployment apparatus recited in claim 1, wherein:

a distance between center lines through the closed-end elongated slots varies from 3.0 to 3.5 inches.

3. In the deployment apparatus recited in claim 1, wherein:

a distance between the center line through the bore and a bottom edge of the second leg of the L-shaped bracket varies from 1.6 to 1.7 inches.

4. In the deployment apparatus recited in claim 3, wherein:

a distance between a top edge line on the second leg and a longitudinal center line through a nearer closed-end elongated slot of the L-shaped bracket varies from 1.1 to 1.3 inches.

* * * * *

UNITED STATES PATENT AND TRADEMARK OFFICE
CERTIFICATE OF CORRECTION

PATENT NO. : 7,034,667 B2
APPLICATION NO. : 10/796129
DATED : April 25, 2006
INVENTOR(S) : William H. Redfield Page 1 of 1

It is certified that error appears in the above-identified patent and that said Letters Patent is hereby corrected as shown below:

On the Title Page, in the left column, under the heading "U.S. PATENT DOCUMENTS", please make amendments as follows:
line 1, change "2,209,407" to --2,209,477--; and In the specification please make amendments as follows:
column 1, line 8, change "patent application" to --Patent Application--;
        line 54, after "at", insert --an--;
column 2, line 22, change "wire" to --wires--;
        line 25, change "wire" to --wires--;
        line 55, delete "Ser.";
column 4, line 2, change "wire" to --wires--; and
column 5, line 21, change "that" to --the--.

Signed and Sealed this

Fifth Day of September, 2006

JON W. DUDAS
*Director of the United States Patent and Trademark Office*